US006915239B2

(12) United States Patent
Bergman et al.

(10) Patent No.: US 6,915,239 B2
(45) Date of Patent: Jul. 5, 2005

(54) METHOD AND APPARATUS FOR OPPORTUNISTIC DECISION SUPPORT FROM INTERMITTENT INTERCONNECTED SENSORS AND DATA ARCHIVES

(75) Inventors: Lawrence D. Bergman, Mt. Kisco, NY (US); Yuan-Chi Chang, White Plains, NY (US); Matthew Leon Hill, Yonkers, NY (US); Chung-Sheng Li, Ossining, NY (US); John R. Smith, New Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 472 days.

(21) Appl. No.: 10/047,854

(22) Filed: Jan. 16, 2002

(65) Prior Publication Data

US 2004/0068496 A1 Apr. 8, 2004

Related U.S. Application Data

(60) Provisional application No. 60/263,026, filed on Jan. 19, 2001, and provisional application No. 60/263,039, filed on Jan. 19, 2001.

(51) Int. Cl.$^7$ .................................................. H04Q 9/00
(52) U.S. Cl. ...................................... 702/188; 702/190
(58) Field of Search ....................... 340/870.11, 870.13, 340/229–240, 311, 915; 700/29–31, 50, 51; 702/187–194

(56) References Cited

U.S. PATENT DOCUMENTS

| | | | | | |
|---|---|---|---|---|---|
| 5,532,702 A | * | 7/1996 | Mintz | .......................... | 342/463 |
| 5,854,994 A | * | 12/1998 | Canada et al. | ................. | 702/56 |
| 5,864,773 A | * | 1/1999 | Barna et al. | ................... | 702/85 |
| 6,058,137 A | * | 5/2000 | Partyka | ........................ | 375/131 |
| 6,195,018 B1 | * | 2/2001 | Ragle et al. | ............ | 340/870.01 |
| 6,577,976 B1 | * | 6/2003 | Hoff et al. | ...................... | 702/95 |
| 2004/0102921 A1 | * | 5/2004 | Tovinkere et al. | ........... | 702/179 |

* cited by examiner

*Primary Examiner*—Marc S. Hoff
*Assistant Examiner*—Craig Steven Miller
(74) *Attorney, Agent, or Firm*—Ido Tuchman

(57) ABSTRACT

Described is a method and apparatus for obtaining accurate, timely information for event detection and prediction based on autonomous opportunism. The objective is to make the best possible use of all available resources at the time of acquisition, including historical data, multiple sensors, and multiresolution acquisition capabilities, under a given set of processing and communication bandwidth constraints. This method (and the corresponding apparatus) fuses multiple adaptively acquired data sources to prepare information for use by decision support models. The onboard data acquisition schedule is constructed to maximize the prediction accuracy of the decision models, which are designed to operate progressively, utilizing data representations consisting of multiple abstraction levels and multiple resolutions. Due to the progressive nature of these models, they can be executed onboard even with the use of substantially summarized (or compressed) datasets delivered from the ground or from other satellite platforms. Models are formulated to accept data with less than complete certainty, thus allowing real-time decisions to be made on locations where additional data is to be acquired based on predicted likelihood of the event of interest and uncertainties. Multi-abstraction-level multi-resolution data is expressed using standard-compliant representations, and progressively transmitted to the ground or other platforms. More detailed calculations can then be performed on the ground using all of the available real time and historical data.

10 Claims, 6 Drawing Sheets

METHOD AND APPARATUS FOR OPPORTUNISTIC DECISION SUPPORT FROM INTERMITTENT INTERCONNECTED SENSORS AND DATA ARCHIVES

CROSS-REFERENCE TO RELATED APPLICATION

This application claims the benefit of U.S. Provisional Patent Application Ser. Nos. 60/263,026 and 60/263,039, each filed Jan. 19, 2001, and each of which is incorporated herein by reference. This application is related to U.S. patent application Ser. No. 10/047,863, filed contemporaneously herewith and incorporated herein by reference.

FIELD OF THE INVENTION

The invention is directed to data acquisition in a sensor web environment, and in particular to a sensor web formed by a number of sensors collecting locally and remotely sensed data.

DESCRIPTION OF THE PRIOR ART

There are a number of research areas related to model-based decision support and risk assessment using multiple data sources. These can be categorized into:

Multi-sensor data fusion or data fusion from sensor web: Multi-sensor data fusion, combining information from multiple data sources based on probabilistic frameworks to generate decisions, has been investigated using approaches such as Bayesian networks and the Dempster-Shafer theory of evidence.

Error and missing data concealment: This has been studied in the context of sending multimedia data such as images or videos over the Internet, which may randomly drop packets due to network congestion. Various techniques based on spatial or temporal interpolation/extrapolation of image or video have been proposed. In the remote sensing area, it has become a common practice at National Oceanic and Atmospheric Administration (NOAA) to combine Advanced Very High Resolution Radiometer (AVHRR) data taken at different time instants, which takes multiple snapshots of the same location during the same day, to generate cloud-free atmospheric composites.

Spatial data mining: This is an emerging discipline which extends the discovery of association rules in more traditional data mining to the discovery of spatial association rules, in particular for those data with Geographic Information System attributes (such as zip codes or latitude/longitude). A tutorial of the spatial data mining area can be found, for example, at http://db.cs.sfu.ca/GEoMiner/survey/html/survey.html. A number of earth-science systems incorporate such technology, including
SPIRE(http://www.research.ibm.com/networked_data_systems/spire), AdaM project from University of Alabama at Huntsville (http://datamining.itsc.uah.edu/adam/index.html), and the Seasonal to Interannual Earth Science Information Partner (SIESIP) from George Mason University (http://www.siesip.gmu.edu).

Content-based search: This technique utilizes low-level image features such as texture, color histogram, and shape to retrieve images or image regions from an image database. The classical examples include the IBM QBIC project and the Virage system (one of the Informix datablades). The UCSB Alexandria project extends the functionality to the retrieval of images based on local texture features. The SaFe and Visual-Seek projects from Columbia University and the Blob-world and Bodyplan projects from UC Berkeley support image search based on spatial configurations of objects and regions.

Progressive data representation and transmission: There has been substantial research during the past decade devoted to data representations to facilitate progressive data retrieval, transmission, and browsing. In particular, variations of wavelet techniques that decompose data in the spatial frequency domain have been developed in both scientific and commercial environments.

The foregoing approaches are inadequate to support opportunistic distributed decision support applications. Specifically, prior work in the field of multi-sensor fusion has not considered progressive execution nor exploiting progressive data representation to facilitate onboard processing. Investigations in error and missing data concealment have not rigorously treated the issue of propagating uncertainty characterizations, nor has the work on spatial data mining and content-based search. Progressive data representations have been considered in the context of progressive transmission, but their implications for progressive model execution or opportunistic collaboration have yet to be explored.

SUMMARY OF THE INVENTION

Therefore, it is an object of the invention to provide a system and method for opportunistic decision support that takes advantage of progressive data representations adaptively acquired at multiple resolutions from multiple input sources with varying degrees of certainty and that are processed into multiple abstraction levels, for example, contour representations, or semantically labeled regions.

It is another object of the invention to provide a system and method for opportunistic decision support that includes a multi-modal inferencing framework that reasons progressively using the proposed data representations, incorporating both a priori and posteriori knowledge (including uncertainty information) associated with each data source.

It is another object of the invention to provide a system and method for opportunistic decision support that includes the ability for individual mobile sensors, such as satellites, to form ad hoc sensor webs and to seek out and task other available sensors using standardized progressive data representations.

The foregoing objects are achieved in accordance with the present invention, which is a method and apparatus for obtaining accurate, timely information for event detection and prediction based on autonomous opportunism. The objective is to make the best possible use of all available resources at the time of acquisition, including historical data, multiple sensors, and multiresolution acquisition capabilities, under a given set of processing and communication bandwidth constraints. This method (and the corresponding apparatus) fuses multiple adaptively acquired data sources to prepare information for use by decision support models. The onboard data acquisition schedule is constructed to maximize the prediction accuracy of the decision models, which are designed to operate progressively, utilizing data representations consisting of multiple abstraction levels and multiple resolutions. Due to the progressive nature of these models, they can be executed onboard even with the use of substantially summarized (or compressed) datasets delivered from the ground or from other satellite platforms. Models are formulated to accept data with less than complete certainty, thus allowing real-time decisions to be made on locations where additional data is to be acquired based on predicted likelihood of the event of interest and uncertainties. Multi-abstraction-level multi-resolution data is expressed using standard-compliant representations, and progressively transmitted to the ground or other platforms. More detailed calculations can then be performed on the ground using all of the available real time and historical data.

Thus, in one aspect of the invention, a method for performing progressive data acquisition in a sensor web environment is provided, the method comprising: using data from a first sensor, one or more surrounding sensors, and from a base station, whereby to attain optimal data acquisition of dynamic event where the location and time of such events cannot be anticipated.

In another aspect of the invention, a sensor subsystem for use in a system comprising one or more other similar sensor subsystems and a base processing system is provided, the sensor subsystem comprising: two or more data sources for gathering parameter data; a data summarizer which fuses parameter data gathered by two or more data sources to create an abstract data parameter; a progressive model, which takes as input abstract data parameters, and generates an output data model; and means, which takes as input the output data model and derives an optimized schedule for (i) subsequent gathering of data by the sensor subsystem and (ii) subsequent transmission of model data to the base processing station, so as to maximize accuracy of a data model executed by the base station.

In yet another aspect of the invention, a base processing system for use in a system comprising two or more sensor subsystems is provided, the base processing system comprising: two or more data sources for gathering parameter data, at least one of the data sources being a sensor subsystem for generating model representing data gathered by two or more sensor subsystems; a data summarizer which fuses parameter data gathered by the two or more data sources to create an abstract data parameter; and a progressive model which takes as input abstract data parameters and generates an output data model upon which a decision maker can base a decision.

In a still further aspect of the invention, a method, performed by a first remote sensor subsystem, is provided for enabling the a first remote sensor subsystem to opportunistically collaborate with one or more other remote sensor subsystems in a system comprising two or more sensor subsystems and a base processing system, the method comprising: performing a model based processing of information collected by sensors located on board the first remote sensor subsystem; seeking out one or more neighboring remote sensor subsystems; if there is a neighboring remote sensor subsystem, passing information to the neighboring remote sensor subsystem, and if not, transmitting the information to the base processing system.

BRIEF DESCRIPTION OF THE DRAWINGS

These and other features and advantages of the present invention will become apparent from the following detailed description, taken in conjunction with the accompanying drawings, wherein.

DESCRIPTION OF THE PREFERRED EMBODIMENT

The present invention includes the following major functional components: (1) Data exploitation: Progressive data representations adaptively acquired at multiple resolutions from multiple input sources with varying degrees of certainty are processed into multiple abstraction levels, for example, contour representations, or semantically labeled regions. (2) Progressive reasoning: A multi-modal inferencing framework that reasons progressively using the progressive data representations, incorporating both a priori and posteriori knowledge (including uncertainty information) associated with each data source, and (3) Opportunistic collaboration: The ability for individual remote sensors (such as satellites) to form ad hoc sensor webs and seek out and task other available sensors using standardized progressive data representations.

Figure 1:
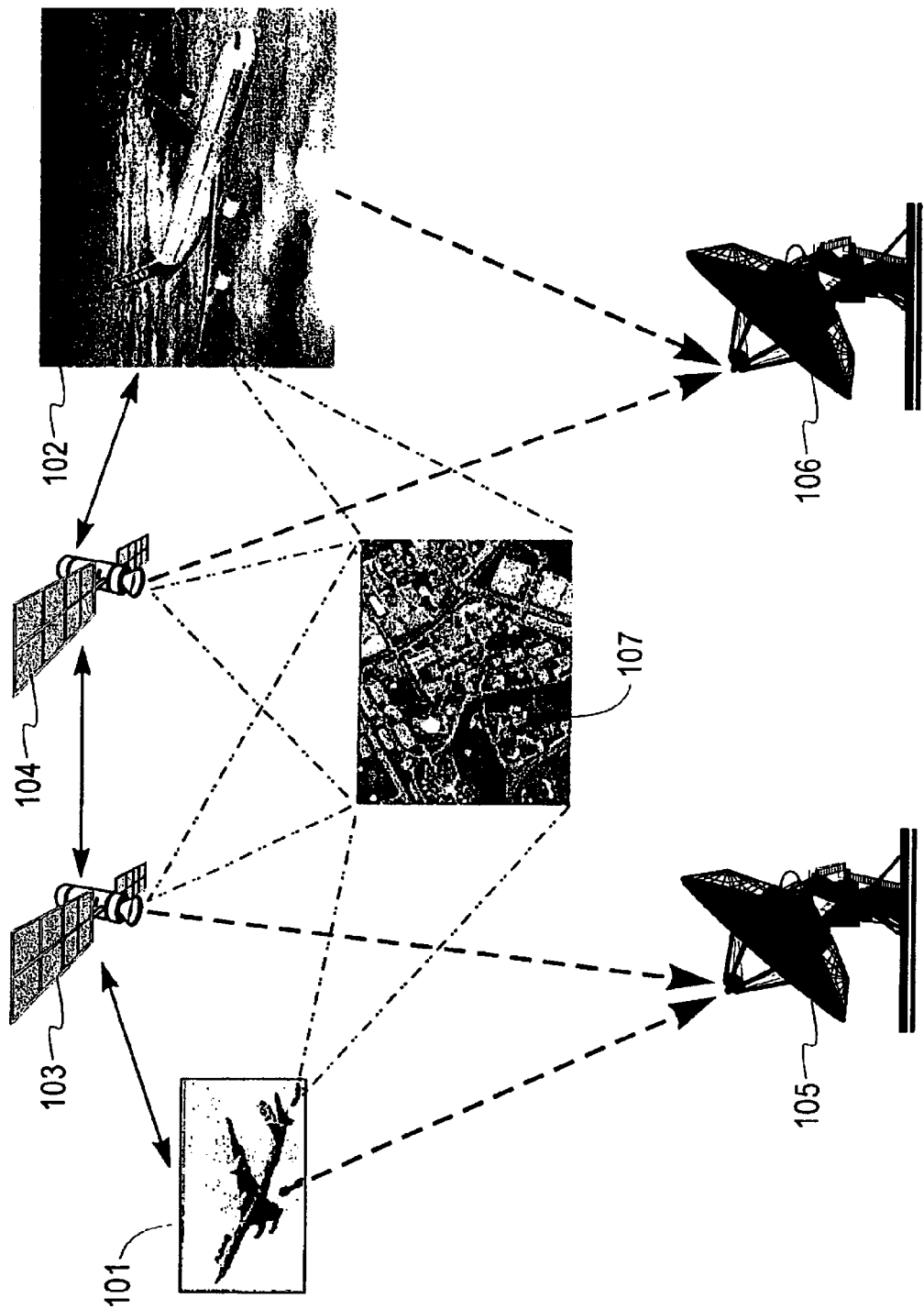
FIG. 1 illustrates the structure of mobile sensors (earth observing satellites, aircraft, and potentially moving vehicles) communicating with nearby mobile sensors and the ground stations.

FIG. 1 is an example of a sensor web system in which the present invention can be used. The system includes multiple mobile sensors such as satellites (103, 104) and aircraft (101, 102) for performing both passive remote sensing of the earth in the visible, infrared, and other spectral bands, and active remote sensing using instruments such as Synthetic Aperture Radar (SAR). Also included are ground/base stations (105,106), which perform data acquisition from the surface of the earth (107) and the environments surrounding the sensor.

Figure 2:
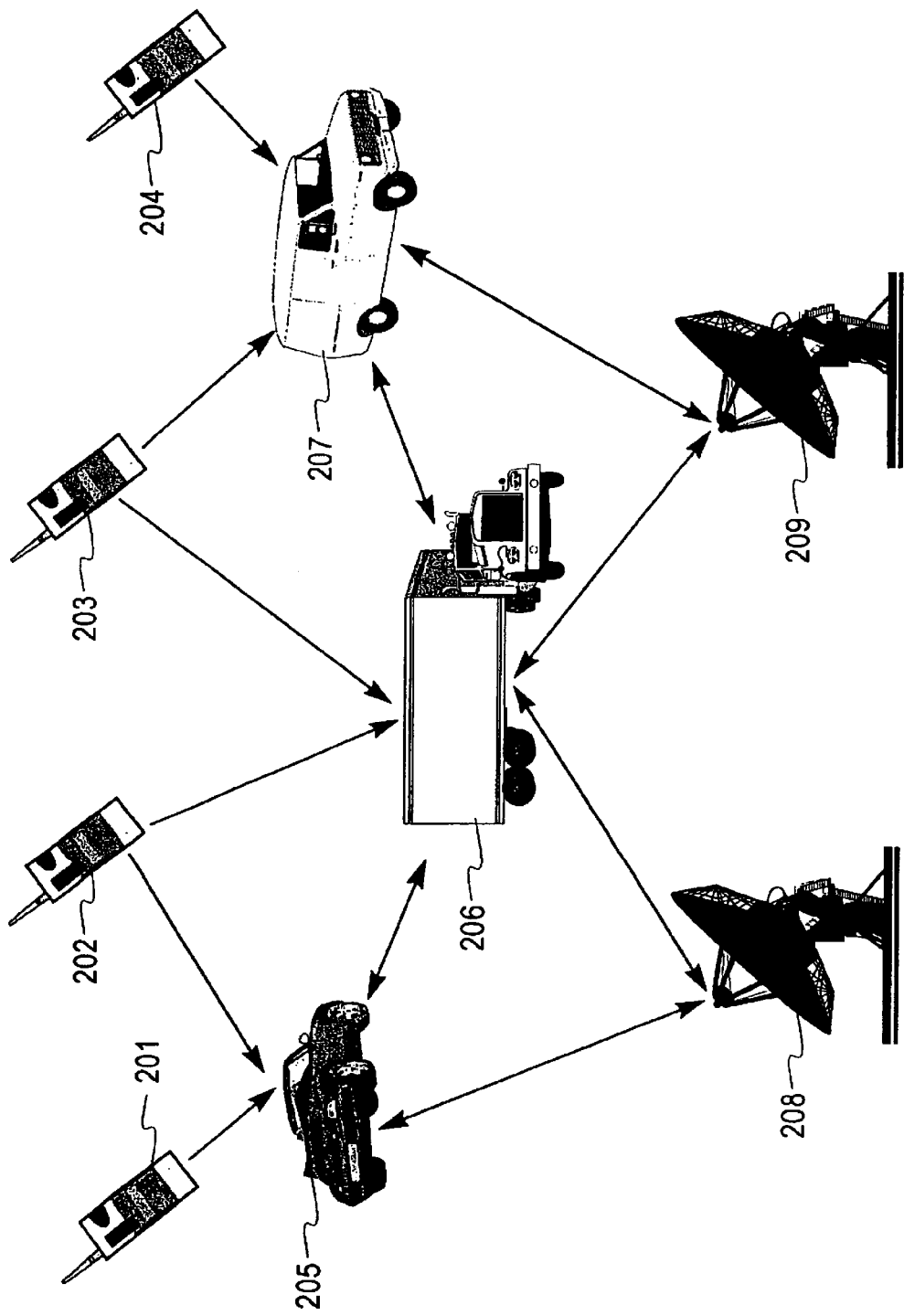
FIG. 2 illustrates the structure of fixed sensors communicating with their base stations through moving intermediate mobile relay stations.

A second example of a system that can make use of the present invention is shown in FIG. 2. The system includes:
  multiple stationary sensors (201, 202, 203, 204), which are often deployed at remote locations (such as close to the sea shore) for measuring environmental parameters such as pressure, moisture, temperature, air quality etc.
  stationary and mobile relays (205, 206, 207)—as the stationary sensors usually have difficulties in communicating with the base station directly due to their power, bandwidth, and battery life limitations. For the scenarios when mobile relays (cars, trucks, ships, satellites, or other moving objects) are used, the communication pattern is similar to those described in FIG. 1 in which no permanent scheduling of the trajectory of these moving objects are centrally planned.
  base stations (208,209) for performing data acquisition, analysis, and decision support from the environments surrounding the sensor.

The general challenges for data acquisition in a mobile sensor web environment (for systems illustrated in FIGS. 1 and 2) include:
  Communication bandwidth limitation between the sensor and the ground/base station, such as due to deep space fading and power limitation of the sensor's onboard transceiver for sending and receiving the signals;

Lack of relays which are within reach (line of sight in many cases) to forward the signals to the base station (such as the scenario depicted in FIG. 2), or none of the ground stations are within reach (line of sight in many cases) when the event of interest occurred;

Limitation of the sensors' onboard memory size and power consumption, which constrains the spatial and temporal resolution of data acquisition.

As a result, it has heretofore been difficult to perform real-time event-driven data acquisition when the location and instant of event cannot be anticipated. In order to be able to capture data associated with real-time events, a sensor web must acquire the data at the maximal (and uniform rate) allowed by the communication channel bandwidth so that the ground station can perform subsequent analysis.

Figure 3:
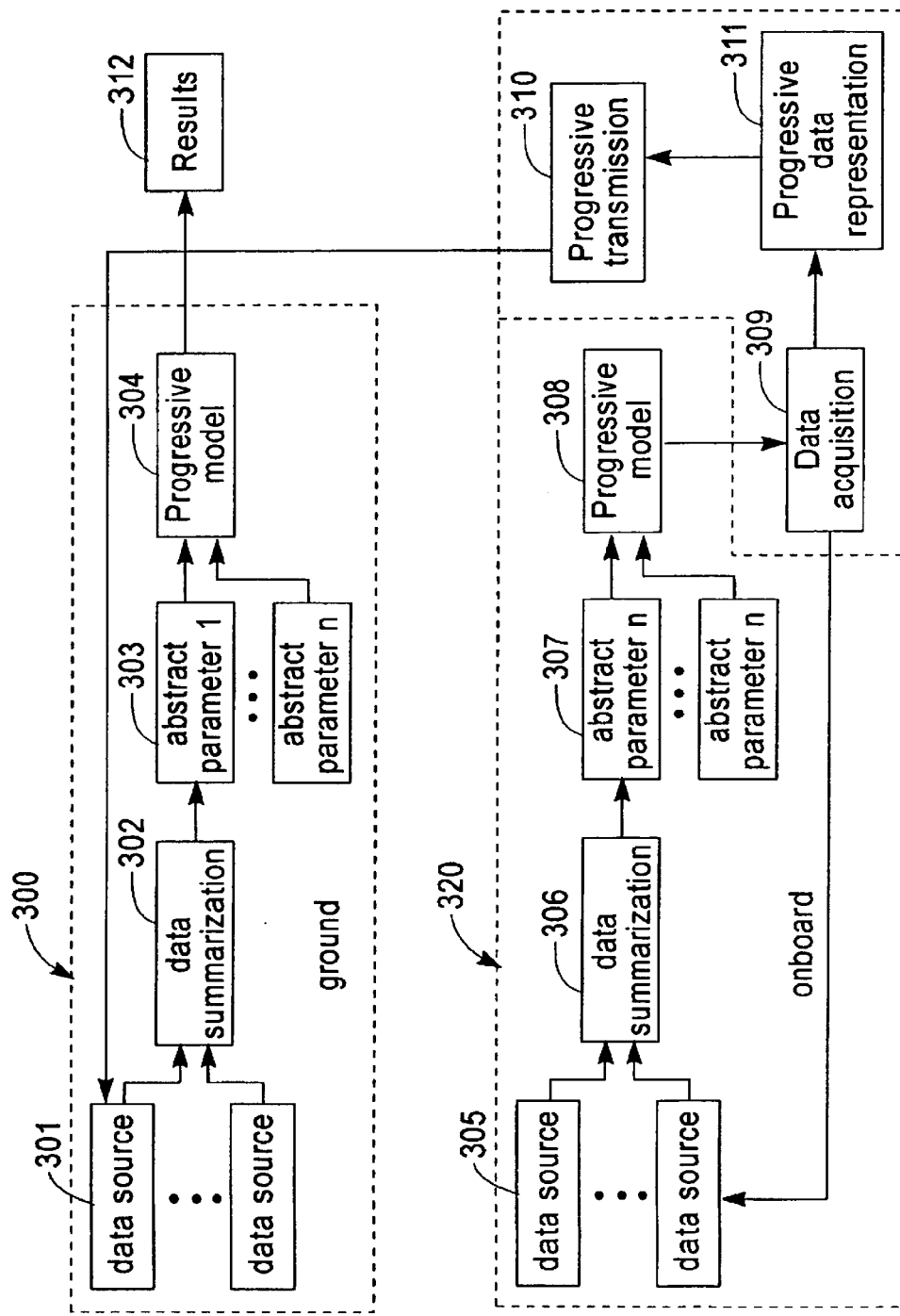
FIG. 3 illustrates the structure of the modules for the ground base stations and mobile sensors of FIGS. 1 and 2.

A functional block diagram of the architecture of the present invention is shown in FIG. 3. For simplicity we show a single remote (e.g., space borne) sensor subsystem 300 and a local, base (e.g., ground-based) processing subsystem 320. Note that in general, multiple remote and local systems may be executing concurrently.

The subsystems include:

Data exploitation through data transformation and summarization: Each subsystem (300, 320) has a number of data sources (301, 305), the outputs of which are fused by data summarizers (302, 306) based on a probabilistic framework (as described below with respect to FIG. 4) to create abstract data parameters (303 and 307). The term abstract data parameters is used to mean parameters that are not directly measured by the instruments. In the context of a satellite/ground-based system, such abstract parameters might represent vegetation and moisture. A variety of historical and/or real-time sources can contribute to the generation of each abstract parameter, with associated uncertainties.

Progressive model execution (304, 308): Autonomous execution of the model(s) is used to produce schedules for both acquisition and transmission. These schedules are continuously refined as additional parameters at higher resolution are incorporated into the model execution. Model predictions and associated uncertainty measures contribute to the data acquisition schedule. Progressive model execution is described in detail below.

The following additional functional components are found in a remote sensor subsystem in accordance with the invention (with reference to "Progressive Content-Based Retrieval of Image and Video with Adaptive and Iterative Refinement" issued as U.S. Pat. No. 5,734,893, incorporated herein by reference):

Progressive Data acquisition (309): The acquisition sensor or instrument acquires data progressively according to a schedule derived from the output of progressive model execution. The schedule is optimized such that the accuracy of the model executed on the ground will be maximized. More precisely, the steps of progressive data acquisition are as follows:

Perform coarse-scale data acquisition (acquire the data at lower spatial and/or temporal resolution)

Perform model execution based on the coarse-scale data

Rank the region in terms of its relative importance based on the model output

Perform fine-scale data acquisition according to the rank ordering of the regions The model execution is then performed based on the global coarse-scale and local fine-scale data.

This process (of going through the data acquisition of regions in terms its relative ranking based on the model execution from the initial coarse-scale data acquisition) is repeated as long as time permits. Note that there is a finite amount of time that the sensor is permitted to perform data acquisition. In the scenario of FIG. 1, the mobile sensors (such as satellites) constantly move on top of the earth. In the scenario of FIG. 2, the mobile relay will move out of the reach (line of sight) eventually.

Progressive data representation generation (311): A progressive data representation is generated so that the data can be segmented and represented in terms of objects. Each object is represented by multiple abstraction levels (semantics, features, and raw data). This representation facilitates progressive onboard model execution and progressive data transmission to the ground stations and other spacecrafts or satellites. More precisely, the progressive data representation consists of:

Coarse-to-fine progressive data representation: techniques such as wavelet representation, subband coding, and the recent image standard such as JPEG 2000 already provide well-known methodologies to implement progressive data representation where the data is represented starting from the coarse level (or low-resolution level) and progress towards fine (or high-resolution level).

Combining progressive data representation with progressive data acquisition: in this case, the progressive data acquisition is "synchronized" with the progressive data representation both in terms of spatial and temporal resolution.

Progressive transmission (310): A progressive transmission schedule is also derived from progressively executing the model(s) so that the accuracy of the ground model execution is optimized during the whole course of data transmission. Progressive transmission may involve the scheduling of data from different instruments and/or different regions of data from the same instrument. Based on progressive data representation, progressive data transmission involves the transmission of the most important or essential elements of the data, followed by the less important or less essential data, and so on until all the data is transmitted. Progressive transmission (in conjunction with progressive data representation and acquisition) allows much simpler error concealment as the coarse level representation will always be prioritized. And the loss of the fine level does not impact the overall presentation/processing of the data.

Figure 4:
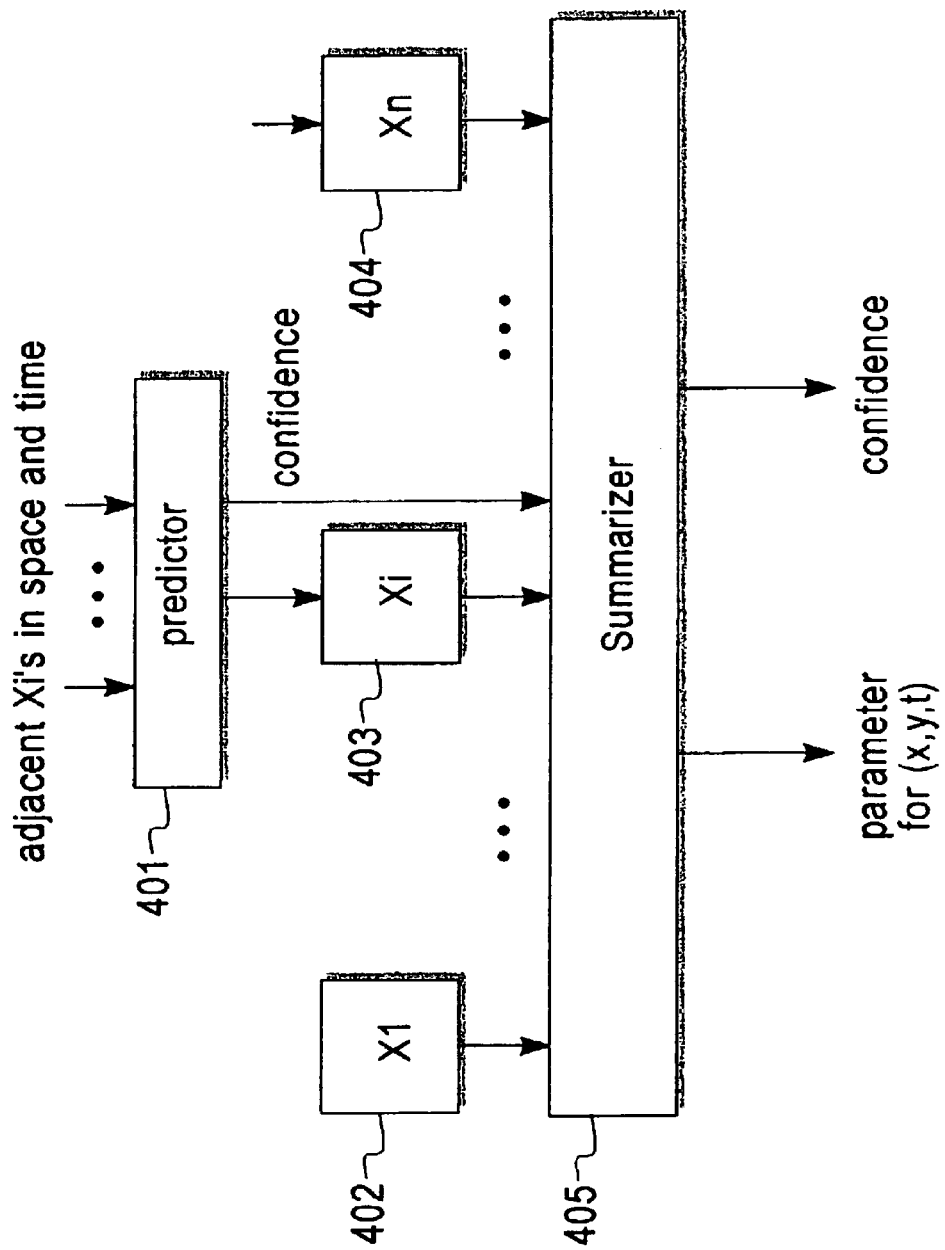
FIG. 4 illustrates the structure of a summarizer of FIG. 3.

FIG. 4 illustrates the process of multi-modal data summarization (302 and 306 in FIG. 3). The main purpose of this process is to fuse data from multiple sensors or instruments, each of which can provide information for the same category—such as ground moisture or precipitation. Note that with the data acquisition methods and apparatus of the prior art, data processing onboard remote sensors is mostly limited to data compression, with the remaining processing being performed on ground. In accordance with the present invention, data summarization is performed both onboard a remote data sensor (by 305 and 306) as well as on the local substation (i.e., by 301 and 302) so that optimal progressive data acquisition based on real-time events can be achieved. This has numerous advantages. Since direct measurement of the specific parameters of interest might not be available, it may be necessary to infer the parameter from multiple sensors. Furthermore, each of the sensors will produce errors during the measurement process, have varying degrees of reliability (due to cloud cover, for example), or be unavailable for specific locations and times. By providing the capability for fusion of data from adjacent locations and/or previous time periods on board remote data sensors, accurate, and, in certain instances, indirectly sensed data, can be used intelligently by remote sensors to gather further, more relevant information without the communication bottleneck of prior systems.

Referring to FIG. 4, the summarizer includes a prediction stage (401) and a summarization stage (405). The prediction stage fills in missing spatial and temporal locations using several techniques including spatial interpolation, temporal extrapolation, and error concealment. The summarization stage combines (or sometimes referred to as "fuses" in the literature) data from a number of input sources (402, 403, 404) using techniques such as Bayesian networks or the Dempster-Shafer methodology. Both Bayesian network and Dempster-Shafer methodology have been well known in the prior art. Its specific instantiation in the multi-sensor fusion area can be found, for example in Richard R. Brooks and S. S. Iyengar, "Multi-sensor Fusion: Fundamentals and Applications with Software," Prentice Hall PTR, 1998, Chapter 8: Representing Ranges and Uncertainties in Data Structures. The main distinction of using these two methodologies is:

When the a priori knowledge of the instrument is known, the uncertainty as well as the a priori knowledge of the instrument can be utilized in Bayesian network formulations.

When the a priori knowledge of the instrument is absent, the Dempster-Shafer framework will be preferred.

Outputs from the summarizer will be abstract variables (i.e., variables not directly measured by sensors, such as temperature or moisture) and associated uncertainties (303 and 307 in FIG. 3). It is important to note that uncertainties are introduced not only by sensor inaccuracies, but also by the process of data substitution. For example, a temperature map that is 24 hours old will have much higher uncertainty than one that is 1 hour old.

The progressive model (304 and 308 in FIG. 3) is designed to enable both real-time remote (onboard) and base (ground) station execution. Onboard execution of reduced resolution models (reduced due to limited storage and processing capacity, and the need for near real-time solutions) provides model prediction estimates, to enable higher resolution data acquisition and earlier transmission in regions of greater interest. More detailed versions of the same model are run on the ground to produce more accurate predictions. In a preferred embodiment of the invention, progressive models involve the generation of increasingly coarse representations of the same model. In the linear model case, the prediction of a variable "R" at location (x,y) and time t might be given by:

$$R(x,y,t)=a_1X_1(x,y,t)+a_2X_2(x,y,t)+a_3X_3(x,y,t)+a_4R(x,y,t-1)$$

If $|a_1,a_2|>>|a_3,a_4|$ then, a coarser representation of the model for R (x,y,t) will be $$R^*(x,y,t)\sim a_1X_1(x,y,t)+a_2X_2(x,y,t)$$

The generation of progressive representations of a model can be accomplished by analyzing the relative contribution of each parameter to the overall model. This is related to query optimization for object-relational databases. Query planning usually rearranges the execution order so that operations resulting in maximal filtering will be executed earliest. In contrast, progressive model generation will first execute those operations most relevant to the final results. The present invention focuses on developing an execution framework that will progressively obtain results based on multiple alternate representations of the model. The selection of a particular alternative depends on the prediction outcome as well as the availability of data.

In addition to the progressive formulation of reasoning, the reasoning/inference formulations need to incorporate uncertainty resulting from the fusion of uncertain instrument data. Methods that are commonly used to describe the uncertainty include: explicit accuracy bound, probabilistic bounds (such as Bayes' rule or Dempster-Shafer methodology), statistical methods, and fuzzy logic.

One problem solved by the present invention is the explicit incorporation of uncertainty as part of the inputs and outputs of the model. The model formulation will address how output uncertainty may change due to changes in input uncertainty. Estimating output uncertainty may be as simple as feeding the model with upper and lower bounds of the range, assuming that the model exhibits monotonicity. More sophisticated models require using Monte Carlo simulation or other statistical techniques to estimate the output interval.

We recognize that in many models, the uncertainty is a function of the data value and this function can be nonlinear. The transformation from the input uncertainty characterization to the output uncertainty estimation will also exhibit nonlinear behavior.

In addition to the uncertainty of input data parameters, the uncertainty that is introduced by the progressive model representation and execution (as described in 304 and 308 in FIG. 3) is explicitly incorporated into the model execution framework. Progressive data acquisition schedules are based on both prediction values, as well as associated uncertainties. In other words, data acquisition schedule for progressive data acquisition is designed so that maximum de-ambiguation or reduction of uncertainty can be accomplished.

A novel feature of the present invention is its use of data from multiple data sources, acquired dynamically, to produce predictions, and guide decision-making. In general, the parameters needed for a particular model will not be available onboard a remote sensing device; they may come from other remote sensors or from historical archives. Consequently, intermediate results of a model need to be passed to another sensor or base station for the next stage of processing. Progressively formulated reasoning greatly facilitates migratable model executions. The present invention employs opportunistic collaboration, which is an autonomic opportunistic-based, migratable model execution approach. This, coupled with an MPEG-7 standard-based model and result description framework, makes the remote-local (satellite-ground) model execution architecture robust, scalable, and interoperable.

Figure 5:
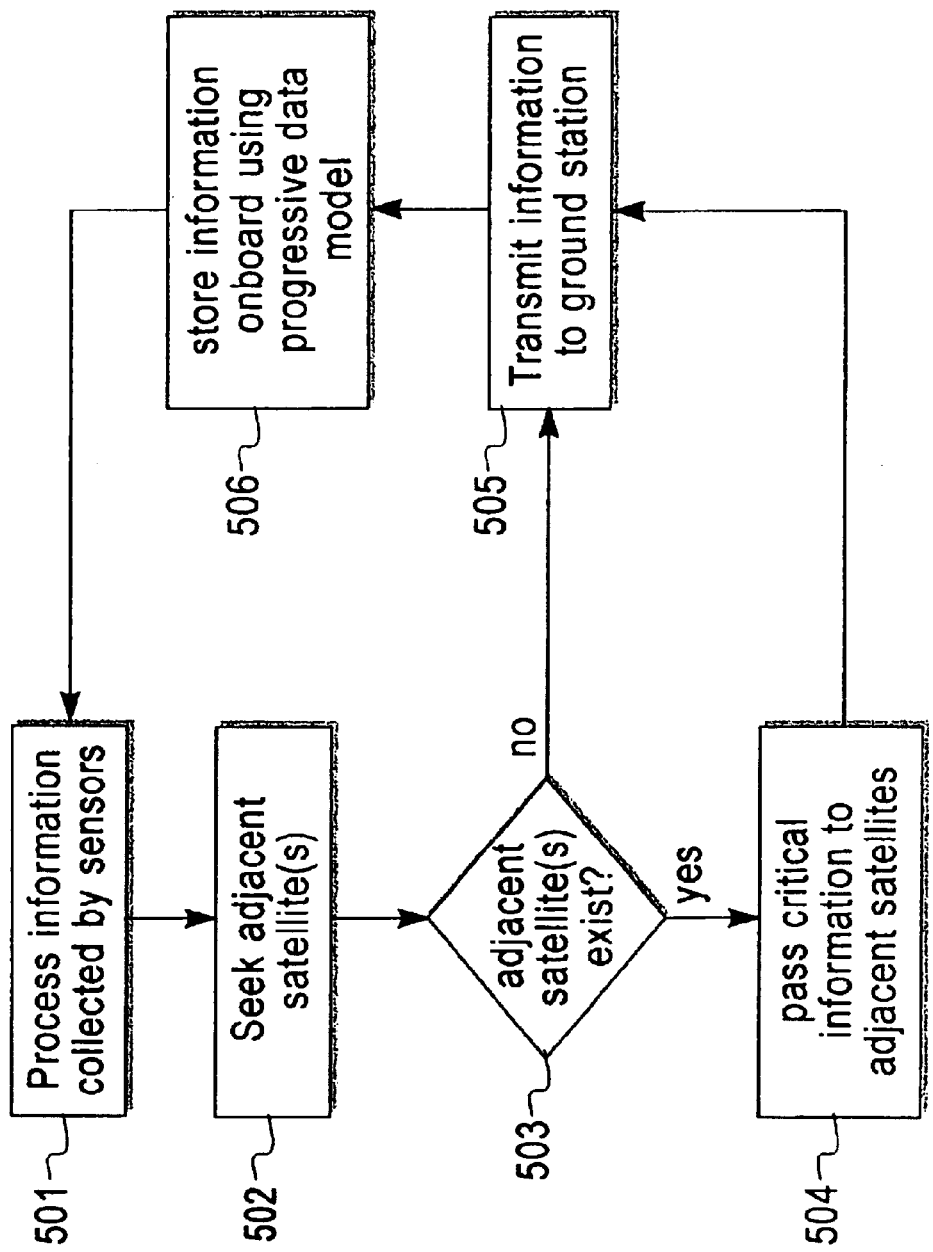
FIG. 5 illustrates the process of automatically and autonomically seeking other mobile sensors to collaborate on data collection and computation.

FIG. 5 illustrates the process of opportunistic collaboration in accordance with the present invention. Using this migration scheme, 1. Step 501: A first remote data sensor (satellite A) performs the model based processing of information collected by the sensors onboard.
2. Step 502: Satellite A seeks out neighboring remote data sensors reachable (within line of sight in the satellite case) once it has finished its part of model data acquisition and processing.
3. Step 503: If there are remote data sensors that are within reach (within line of sight for satellite communication), go to step 504, else go to 505.

4. Step 504: Through multiple passes of message exchanges to discover their capabilities, satellite A then chooses a second remote data sensor (satellite B, or additional satellites) with the required instruments and transmits the summarized data to it (or them) for further processing.
5. Step 505: The information that is critical to the collaborative processing between satellite A and the base (ground) station will be transmitted from satellite A to the ground station.
6. Step 506: Critical information will also be stored by satellite A for use in the future processing of acquired information.

The propagation of model data in the opportunistic migration is completely asynchronous and autonomous without a central controller. The asynchronous and autonomous approach is preferred because it is difficult to schedule the movements of tens or hundreds of satellites with tens to hundreds of models to be executed. While this approach may not achieve global optimization, computing a globally optimal data acquisition schedule adaptive to ground events is not realistically possible. The original Hot Potato routing algorithm is famous for its robustness in dealing with failed networking switches. We expect that asynchronous migration of model execution as described herein will inherit the same robustness.

One prerequisite of model execution migration is that remote data sensors must be able to interpret partially executed model data and descriptions. Although a proprietary model description language can be developed for this purpose, leveraging standard-based descriptions can save software development costs for future satellite platforms. Recently, MPEG-7 standardization activities [http://drogo.cselt.stet.it/mpeg/] have been actively addressing the issue of describing multi-modal, multimedia data. Multimedia data and processing models are orchestrated into a three-level hierarchy consisting of descriptors (D), description schemes (DS), and description definition language (DDL). Most of the sensory data including remotely sensed imagery can be efficiently described by MPEG-7 semantics, thereby making it interoperable with other MPEG-7 compliant applications. Nevertheless, the apparatus and methods described herein will work with models and data described according to other formats and standards.

Figure 6:
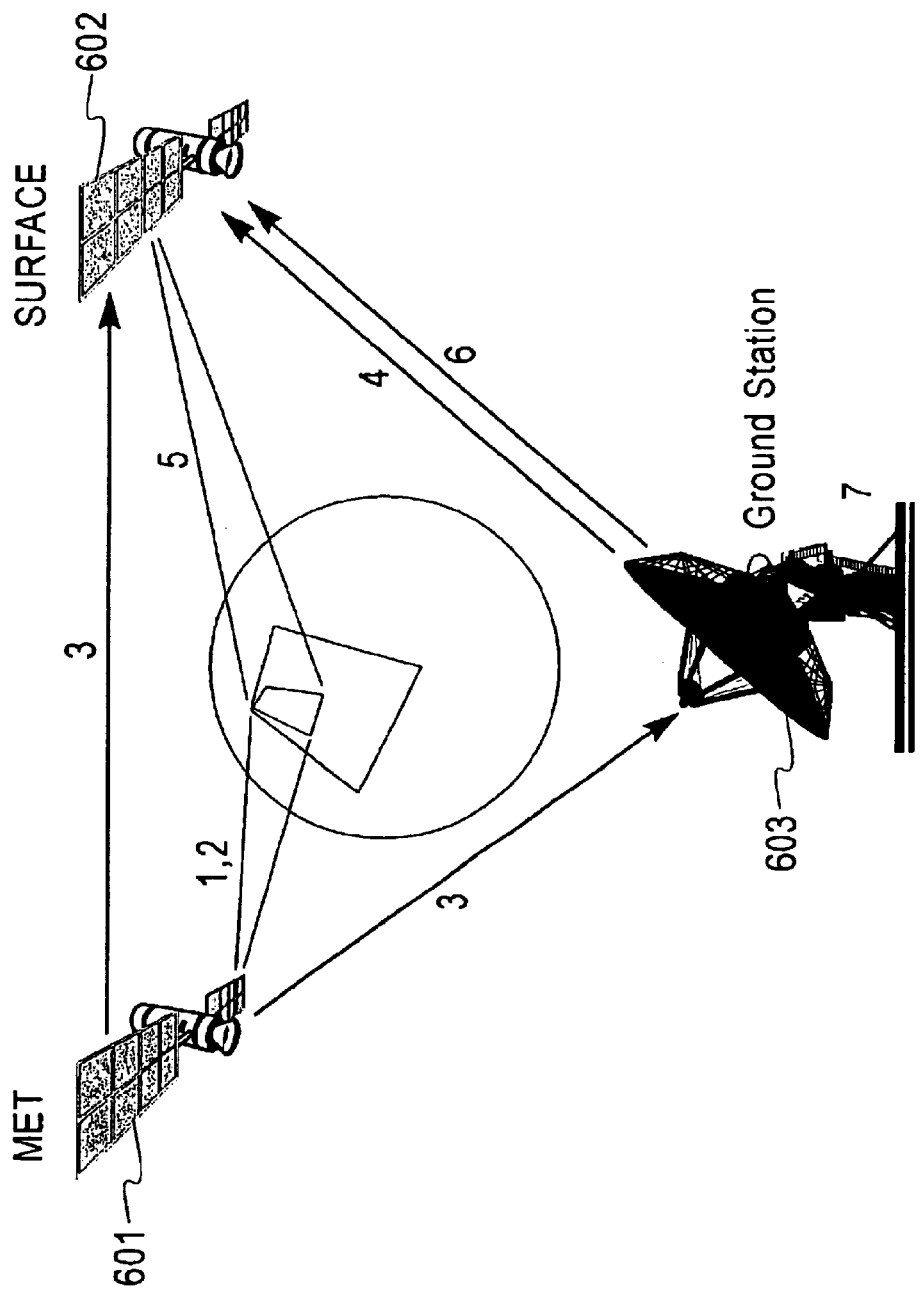
FIG. 6 illustrates one embodiment of the present invention, which involves two satellites and one ground station.

FIG. 6 presents a particular example of the operation of the present invention, in particular, the scenario of flood prediction. This scenario involves a set of satellites (601, 602) that are equipped with multi-resolution sensors. The satellites have the ability to run models on board and to dynamically task sensors based on model output. Onboard models are employed in this scenario to predict spatial and temporal precipitation distribution and to identify areas that are at risk for flooding. The process operates as follows:

Satellite 601 scans the North American continent around the clock and uses a simple onboard precipitation model to provide early identification of areas of potential heavy precipitation based on acquisition of low-resolution temperature and cloud density information.

Satellite 601 rescans areas of high-predicted precipitation at higher resolution, and reruns the precipitation model, generating predictions at a higher confidence level.

Satellite 601 sends the coordinates of "confirmed" heavy precipitation areas to satellite 602, and the adaptively acquired temperature and cloud density data in conjunction with the predictions themselves to a ground station.

Satellite 602 requests a flooding model from the ground, along with the "best" available information on soil types, vegetation index, hydrology and topography.

The ground station delivers reduced resolution data (contours, for example), which summarizes this information.

Satellite 602 does an initial low-resolution scan of the soil moisture (using radar, for example) and uses that data in conjunction with other available data to run the flooding model.

Satellite 602 rescans selected areas at high precision based on the model predictions. In addition, higher resolution information is requested from the ground for certain areas, and the model is rerun for those areas.

Data acquisition/request is directed to areas that have high certainty of flooding or where estimates are uncertain and additional information is required to make a flood/no flood decision.

Data acquisition continues in selected regions based on model updates.

Soil moisture data is transmitted to the ground as acquired.

The ground station 603 runs the flooding model using the adaptively acquired temperature, cloud density and soil moisture readings from the satellites to produce more accurate predictions of water levels.

The process may repeat as the satellites track the movement of the storm.

Nearly every region of the United States experiences flooding. Flash flooding, caused by intense rainfall of relatively short duration, is the top weather-related killer in the United States. Floods can be predicted by hydrological and meteorological modeling—which is a well established but imperfect science. The National Weather Service's (NWS) Centers for Environmental Prediction have developed numerous models for both weather (precipitation in particular) and hydrologic predictions. One popular weather model is Eta. Flood predictions are made by the NWS's River Forecast Centers, such as the Middle Atlantic center that covers New Jersey and surrounding states. Quantitative prediction of intense precipitation is difficult and accuracy is less than desirable. Hydrological modeling is also difficult.

The invention disclosed in this application can aid in this goal by developing a framework for the deployment and integration of a new generation of intelligent remote sensors for hydrometeorology. Remote sensing is already used in hydrometeorology to measure variables such as air temperature, cloud density and soil moisture. Intelligent sensors envisioned by this application will make the highest use of sensor capabilities by directing their attention to regions where events of interest are occurring and gathering data that is more accurate, more frequent or of higher spatial resolution in those regions. Various computational aspects of the present invention can be implemented by means of a suitably programmed computing device located on board a remote sensor or the base station, as appropriate.

Now that the invention has been described by way of a preferred embodiment, with alternatives, various modifications and improvements will occur to those of skill in the art. Thus, it should be understood that the detailed description should be construed as an example and not a limitation of the appended claims.

Having thus described our invention, what we claim as new and desire to secure by Letters Patent is:

1. A sensor subsystem for use in a system comprising one or more other similar sensor subsystems arid a base processing system, the sensor subsystem comprising:

a. Two or more data sources for gathering parameter data;

b. A data summarizer which fuses parameter data gathered by two or more data sources to create an abstract data parameter;

c. A progressive model, which takes as input abstract data parameters, and generates an output data model; and d. Means, which takes as input the output data model and derives an optimized schedule for
   i. (i) subsequent gathering of data by the sensor subsystem and
   ii. (ii) subsequent transmission of model data to the base processing station e. so as to maximize accuracy of a data model executed by the base station.

2. The sensor subsystem of claim 1, wherein the data sources include a data source on board the sensor subsystem, as well as a second sensor subsystem.

3. The subsystem of claim 1, wherein the data summarizer fuses data by using one or more of the following techniques: spatial interpolation, temporal extrapolation, and error concealment.

4. The subsystem of claim 1, wherein the input and output of the progressive model includes an uncertainty estimate.

5. A base processing system for use in a system comprising two or more sensor subsystems, the base processing system comprising:

a. Two or more data sources for gathering parameter data, at least one of the data sources being a sensor subsystem for generating model representing data gathered by two or more sensor subsystems;

b. A data summarizer which fuses parameter data gathered by the two or more data sources to create an abstract data parameter;

c. A progressive model which takes as input abstract data parameters and generates an output date model upon which a decision maker can base a decision.

6. The base processing system of claim 5, wherein the model generated by the sensor subsystem includes an uncertainty estimate.

7. A method, performed by a first remote sensor subsystem, for enabling the a first remote censor subsystem to opportunistically collaborate with one or more other remote sensor subsystems in a system comprising two or more censor subsystems and a base processing system, the method comprising:

a. Performing a model based processing of information collected by sensors located on board the first remote sensor subsystem;

b. Seeking out one or more neighboring remote sensor subsystems:

c. If there is a neighboring remote sensor subsystem, passing information to the neighboring remote sensor subsystem, and if not, transmitting the information to the base processing system.

8. The method of claim 7, wherein step b further comprises exchanging information with one or more neighboring remote sensor subsystems to determine the capabilities of such neighboring remote or subsystems.

9. The method of claim 7, wherein only information critical to collaborative processing is passed from the first remote sensor subsystem to the neighboring sensor subsystem.

10. The method of claim 7, wherein the first remote sensor subsystem stores critical information on board for future processing.

* * * * *

UNITED STATES PATENT AND TRADEMARK OFFICE
CERTIFICATE OF CORRECTION

PATENT NO. : 6,915,239 B2
DATED : July 5, 2005
INVENTOR(S) : Bergman et al.

It is certified that error appears in the above-identified patent and that said Letters Patent is hereby corrected as shown below:

Column 10,
Line 62, "arid" should be -- and --.

Column 12,
Line 9, "censor" should be -- sensor --.
Line 9, "or" should be -- sensor --.

Signed and Sealed this

Thirtieth Day of August, 2005

JON W. DUDAS
*Director of the United States Patent and Trademark Office*